US009854052B2

(12) United States Patent
Abdukalykov et al.

(10) Patent No.: US 9,854,052 B2
(45) Date of Patent: Dec. 26, 2017

(54) BUSINESS OBJECT ATTACHMENTS AND EXPIRING URLS

(71) Applicant: SAP SE, Walldorf (DE)

(72) Inventors: Rolan Abdukalykov, Montreal (CA); Wanling Zhang, Montreal (CA); Vincent LaVoie, Montreal (CA); Xuebo Liang, Brossard (CA); Alain Gauthier, Montreal (CA); Roy Ghorayeb, Montreal (CA); Mohannad El-Jayousi, L'lle-Bizard (CA)

(73) Assignee: SAP SE, Walldorf (DE)

( * ) Notice: Subject to any disclaimer, the term of this patent is extended or adjusted under 35 U.S.C. 154(b) by 687 days.

(21) Appl. No.: 14/040,067

(22) Filed: Sep. 27, 2013

(65) Prior Publication Data

US 2015/0095403 A1    Apr. 2, 2015

(51) Int. Cl.
*H04L 12/58* (2006.01)
*H04L 29/08* (2006.01)
*G06F 17/30* (2006.01)

(52) U.S. Cl.
CPC .... *H04L 67/2842* (2013.01); *G06F 17/30902* (2013.01); *H04L 51/08* (2013.01)

(58) Field of Classification Search
CPC ... G06F 17/30902; H04L 67/42; H04L 51/08; H04L 47/767; H04L 12/584; H04L 67/2842
See application file for complete search history.

(56) References Cited

U.S. PATENT DOCUMENTS 5,864,837 A    1/1999   Maimone
6,529,948 B1 *  3/2003   Bowman-Amuah  . G06F 9/4435
                                                    709/217

(Continued)

FOREIGN PATENT DOCUMENTS

CA    2 615 747       1/2007
EP    1297677 A2      4/2003

(Continued)

OTHER PUBLICATIONS

GloMop: Global Mobile Computing by Proxy, Internet Citation, URL:http://research.microsoft.com/research/os/SOSP-15/Fox.txt, Sep. 13, 1995, 12 pages.

(Continued)

*Primary Examiner* — Aaron Strange
(74) *Attorney, Agent, or Firm* — Jones Day

(57) ABSTRACT

A computer implemented method may include requesting details of an object and attachments associated with the object. The attachment details for each attachment may include an attachment name and an attachment ID. In response to a selection of an attachment associated with the object, a determination may be made as to whether a cache already includes the selected attachment. If the cache includes the selected attachment, the selected attachment may be retrieved from the attachment cache. If the cache does not include the selected attachment, the attachment may be downloaded using an attachment URL. The attachment URL may be requested and generated based on the attachment ID. The downloaded attachment may also be stored in the attachment cache.

13 Claims, 7 Drawing Sheets

(56) References Cited

U.S. PATENT DOCUMENTS

| | | | |
|---|---|---|---|
| 6,564,257 B1* | 5/2003 | Emens | G06F 17/30864 |
| | | | 707/999.01 |
| 6,785,712 B1* | 8/2004 | Hogan | H04B 7/18506 |
| | | | 709/206 |
| 7,340,680 B2 | 3/2008 | Becker | |
| 7,596,523 B2 | 9/2009 | Sobel et al. | |
| 7,788,138 B2 | 8/2010 | Viehmann et al. | |
| 7,934,019 B2 | 4/2011 | Bonar et al. | |
| 8,112,747 B2 | 2/2012 | Haeberle et al. | |
| 8,381,180 B2 | 2/2013 | Rostoker | |
| 8,438,474 B1 | 5/2013 | Lloyd | |
| 8,543,554 B1 | 9/2013 | Singh et al. | |
| 2002/0016718 A1* | 2/2002 | Rothschild | G06F 19/321 |
| | | | 705/2 |
| 2002/0046201 A1* | 4/2002 | Hembry | G06F 17/30595 |
| 2003/0177124 A1* | 9/2003 | Sauri | G06F 17/30011 |
| 2004/0010543 A1* | 1/2004 | Grobman | G06F 17/30902 |
| | | | 709/203 |
| 2008/0082575 A1* | 4/2008 | Peter | G06Q 30/02 |
| 2008/0120129 A1 | 5/2008 | Seubert et al. | |
| 2009/0222450 A1* | 9/2009 | Zigelman | H04L 67/06 |
| 2011/0216981 A1* | 9/2011 | Hiraga | H04N 19/176 |
| | | | 382/233 |
| 2012/0019673 A1 | 1/2012 | Narayanan | |
| 2013/0067170 A1* | 3/2013 | Lam | G06F 17/30902 |
| | | | 711/137 |
| 2013/0068673 A1 | 3/2013 | Maggiore et al. | |
| 2013/0124193 A1 | 5/2013 | Holmberg | |
| 2014/0297759 A1* | 10/2014 | Mody | H04L 51/08 |
| | | | 709/206 |
| 2015/0237077 A1* | 8/2015 | Suryavanshi | H04L 65/1083 |
| | | | 709/204 |

FOREIGN PATENT DOCUMENTS

| | | |
|---|---|---|
| EP | 2339798 A1 | 6/2011 |
| WO | 01/22259 | 3/2001 |
| WO | WO2001016723 A2 | 3/2001 |
| WO | 2006/123328 | 11/2006 |
| WO | 2007/009254 | 1/2007 |
| WO | 2009/149433 | 12/2009 |

OTHER PUBLICATIONS

European Search Report for Application No. 14186606.1, dated Feb. 5, 2015.

European Office Action issued in corresponding European Application No. 14186606.1, dated Sep. 17, 2015.

* cited by examiner

100

| Attachment Cache Reset Event (ACRE) ID | BO Condition Conjunction | Condition 1 | Condition 2 | ... | Condition N |
|---|---|---|---|---|---|
| ACRE1 | AND | Application is closed | Number of objects in search results >= 100 | ... | ... |
| ACRE2 | OR | Application is closed | Number of objects in search results >= 100 | ... | ... |
| ACRE3 | OR | New search is executed | Number of objects in search results >= 50 | ... | ... |
| ACRE4 | OR | Approval of business objects are completed | Attachment Cache size >= 500 MB | ... | ... |
| ... | ... | ... | ... | ... | ... |
| ACREN | ... | Condition A | Condition B | ... | Condition N |

FIG.3

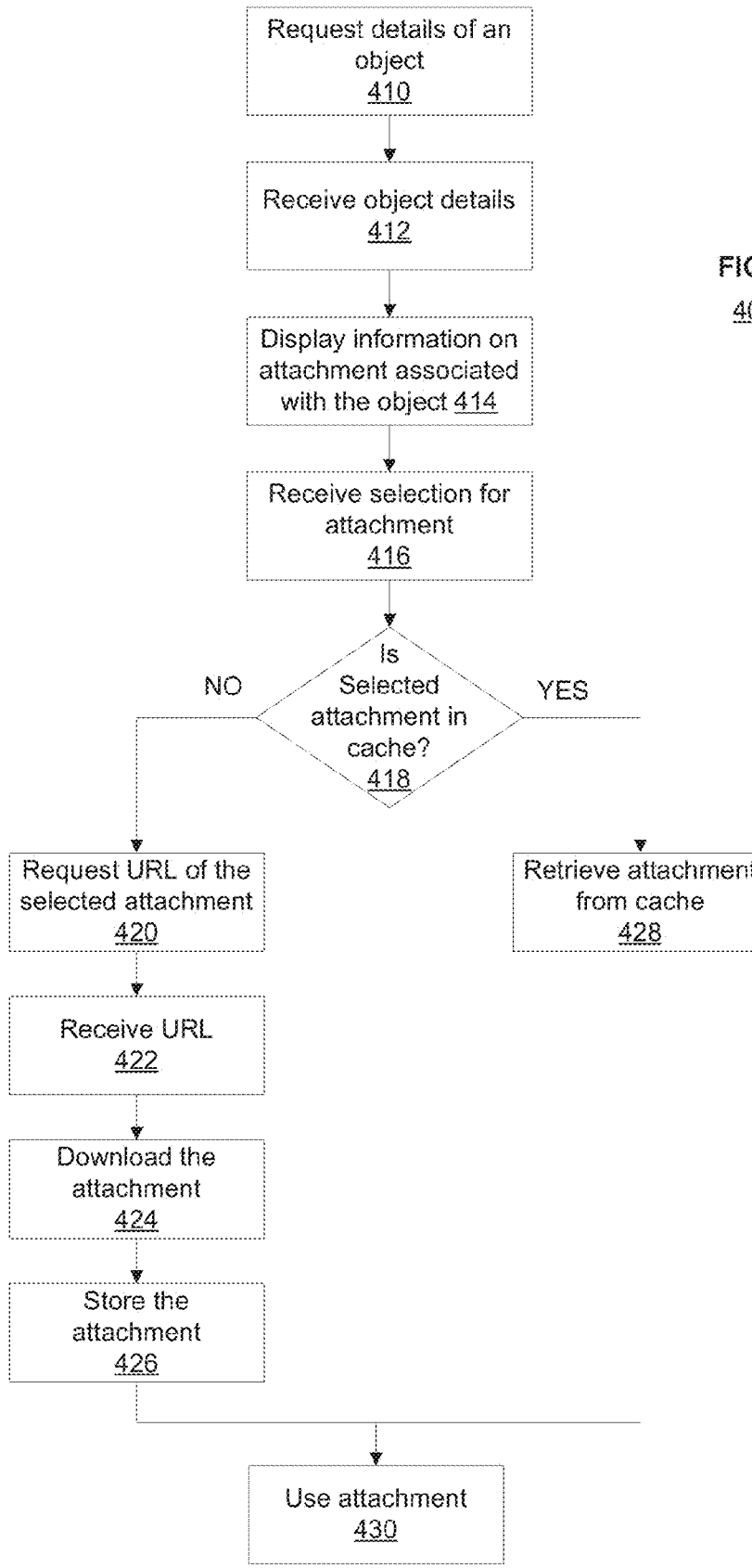

BUSINESS OBJECT ATTACHMENTS AND EXPIRING URLS

BACKGROUND

Attachments may be sent along with a message (e.g., email message) to a recipient of the message. The attachment may include information that cannot be included in the message or may provide information in a format that is different from the format of the message. Examples of attachments that can be sent with messages include documents and images.

The attachments may be sent together with the message or a link to the attachment may be provided with the message. The link to the attachment provides the recipient of the message an option to select whether the attachment is downloaded. For security, these links are made valid for a set period of time. If the user does not download the attachment during the set period of time the user may not be able to download the attachment. Because the users do not always download the attachments immediately using the link or because it may take a long time to download the attachment, for example due to network bandwidth or the size of the file, the period of time set in the link may expire before the attachment is downloaded.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

FIG. 3 illustrates examples of conditions which may be used to reset the cache storing the downloaded attachments.

FIG. 4 illustrates a method of processing a request by a client device to receive an attachment according to an embodiment of the present disclosure.

SUMMARY

A computer implemented method may include requesting an object and receiving the object including attachment details for attachments associated with the object. The attachment details for each attachment may include an attachment name and an attachment ID. In response to a request to display the attachment details for the attachments associated with the object, the attachment name for each attachment associated with the object may be displayed. In response to a selection of one attachment, a determination may be made as to whether a list including attachments stored in an attachment cache includes the attachment ID of the selected attachment. If the list includes the attachment ID of the selected attachment, the selected attachment may be retrieved from the attachment cache. If the list does not include the attachment ID of the requested attachment, the attachment may be downloaded using an attachment uniform resource locators (URL). The attachment URL may be requested using the attachment ID. The downloaded attachment may also be stored in the attachment cache. The attachment cache may be reset when predetermined conditions occur.

DETAILED DESCRIPTION

Embodiments of the present disclosure provide systems and methods for downloading an attachment to a client device. The attachments may be associated with a business object. The method may be performed by a client device and/or a server associated with the client device.

A method to receive an attachment at the client device may include requesting details of an object and attachments associated with the object. The attachment details for each attachment may include a unique attachment ID. In response to a selection of an attachment associated with the object, a determination may be made as to whether a cache already includes the selected attachment. If the cache includes the selected attachment, the selected attachment may be retrieved from the attachment cache. If the cache does not include the selected attachment, the attachment may be downloaded using an attachment URL. The attachment URL may be requested and generated based on the attachment ID. The downloaded attachment may also be stored in the attachment cache.

Unlike the previous methods, the URL may not be provided to the user when the attachment information is sent to the user. The URL may be provided to the user when the user requests the attachment. The URL may be requested based on a unique attachment ID assigned to the attachment. Thus, the user may not have the problems with an expired URL.

In addition, before downloading the requested attachment from an external source, a determination may be made to determine whether the requested attachment is already stored in the cache. If the requested attachment is already stored in the cache it may not be necessary to download the attachment from the external source again. Thus, the time and the resource used to download the requested attachment may be reduced.

Figure 1:
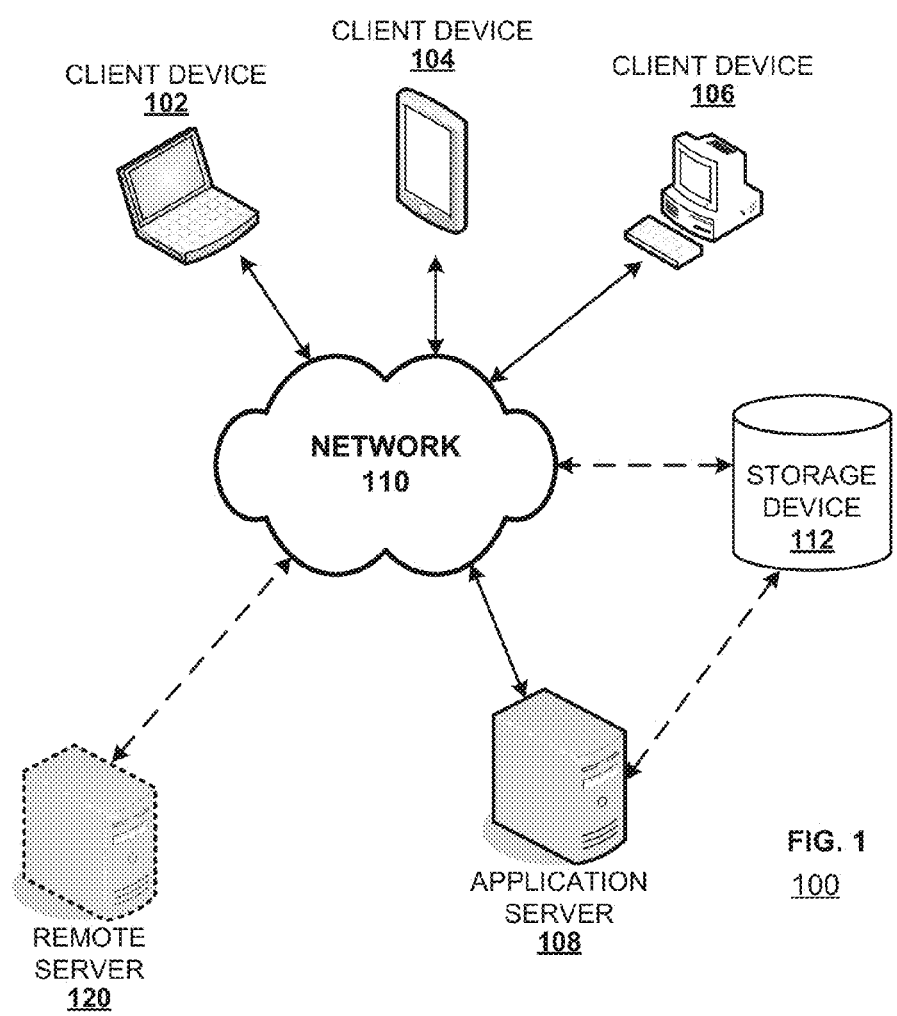
FIG. 1 is a block diagram illustrating an example embodiment of a networked environment in which a client device connects to an application server via a network.

FIG. 1 is a block diagram illustrating an example embodiment of a networked environment 100 in which a client device 102, 104 or 106 connects to an application server 108 via a network 110. The client device 102, 104, or 106 may execute applications provided on the respective client device 102, 104 or 106 or may execute web-based applications provided by the application server 108 via the network 110. The applications executed by the client device 102, 104, or 106 may send and receive data to and from the application server 108 and/or the data storage device 112. The data may be generated, displayed and processed by the client device 102, 104 or 106. The data may include objects (e.g., business objects, messages, emails) and attachments associated with the objects.

The memory in the application server 108 or the data storage device 112 may include, point to, reference or store an object repository (e.g., business object repository). The object repository may access objects in response to request from the client device 102, 104 or 106.

A business object may include a business entity (e.g., an employee or sales order) in a business system. The business object may include functions (in the form of methods) and the data (in the form of attributes). A business object may include a plurality of layers including a kernel layer, an integrity layer, an interface layer and an access layer. The kernel layer may represent the object's inherent data (e.g., name, age, address of an employee or customer). The integrity layer may include business logic of the object. The business logic of the object may include business rules for consistent embedding in the environment and constraints regarding values and domains that apply to the object type. The interface layer may supply valid options for accessing the object type, defining the object's interface to the outside applications. The access layer may define technologies that allow external access to the object data.

A business object associated with attachments may include one or more references to the attachment objects. For example, a business object with associated attachments may be represented to the client in an object oriented way where the business object includes a list of references to the attachment objects. Each attachment object may include information related to the respective attachment such as attachment name, attachment IDs, attachment description, or attachment size.

The attachments may include data or a file (e.g., business object attachment) that is associated with the object. The attachment may not be part of the object but may be referenced by the object. For example, an object may include a message referring to the attachment. In one embodiment, the message includes information about the attachment but will not include the attachment itself. The attachments may include still or video images, text or multimedia documents, e-mails messages, audio segments, voice recordings, or other information. Specific type of business object attachments may include JPEG, Portable Network Graphics (PNG), Portable Document Format (PDF) and PowerPoint® Presentation (PPT). The attachment may be loaded to the client device 102, 104 or 106 from the application server 108 or the data storage device 112. In another embodiment, the attachment may be loaded to the application server 108 or the data storage device 112 from an external server (e.g., remote server 120). The source of the object with which the attachment is associated may be different from the source of the attachment. For example, the source of the object may be from a storage device within an internal network and the source of the attachment may be from a source outside of the internal network.

The network 110 may be an internal network, an external network or a plurality of different interconnected networks which may include the Internet. The remove server 120 may connect via an external network to an internal network connecting the client devices 102, 104 or 106 to the application server 108.

The object and/or the attachment may be displayed on the client device 102, 104, or 106 in response to requests made by a user operating the client device 102, 104 or 106. Based on the displayed data, a user may make business decisions for an organization. The user may issue instructions for the organization via the client device 102, 104, or 106.

The client device 102, 104, 106 may include, for example, a mobile device (e.g., mobile phone or a smart phone), a personal computer, a tablet, a terminal device, or a personal digital assistant (PDA). The client device 102, 104, 106 may include an input device (e.g., a touch screen, a touch pad, a mouse or a keyboard) to receive commands from a user.

The data storage device 112 may be a data warehouse. The data warehouse may perform data cleaning, integration, transformation and refreshing. The data storage device 112 may be an in-memory database (e.g., SAP® HANA database).

In another embodiment, one or more of the client devices 102, 104, 106 may be terminals that display information provided by the application server 108. The application server may execute applications and display information on the client devices 102, 104, 106 in response to commands issued at the client device 102, 104, 106. In this embodiment, information may merely be displayed at the client devices 102, 104, 106 without downloading data objects or attachments to the client devices 102, 104, 106.

Figure 2:
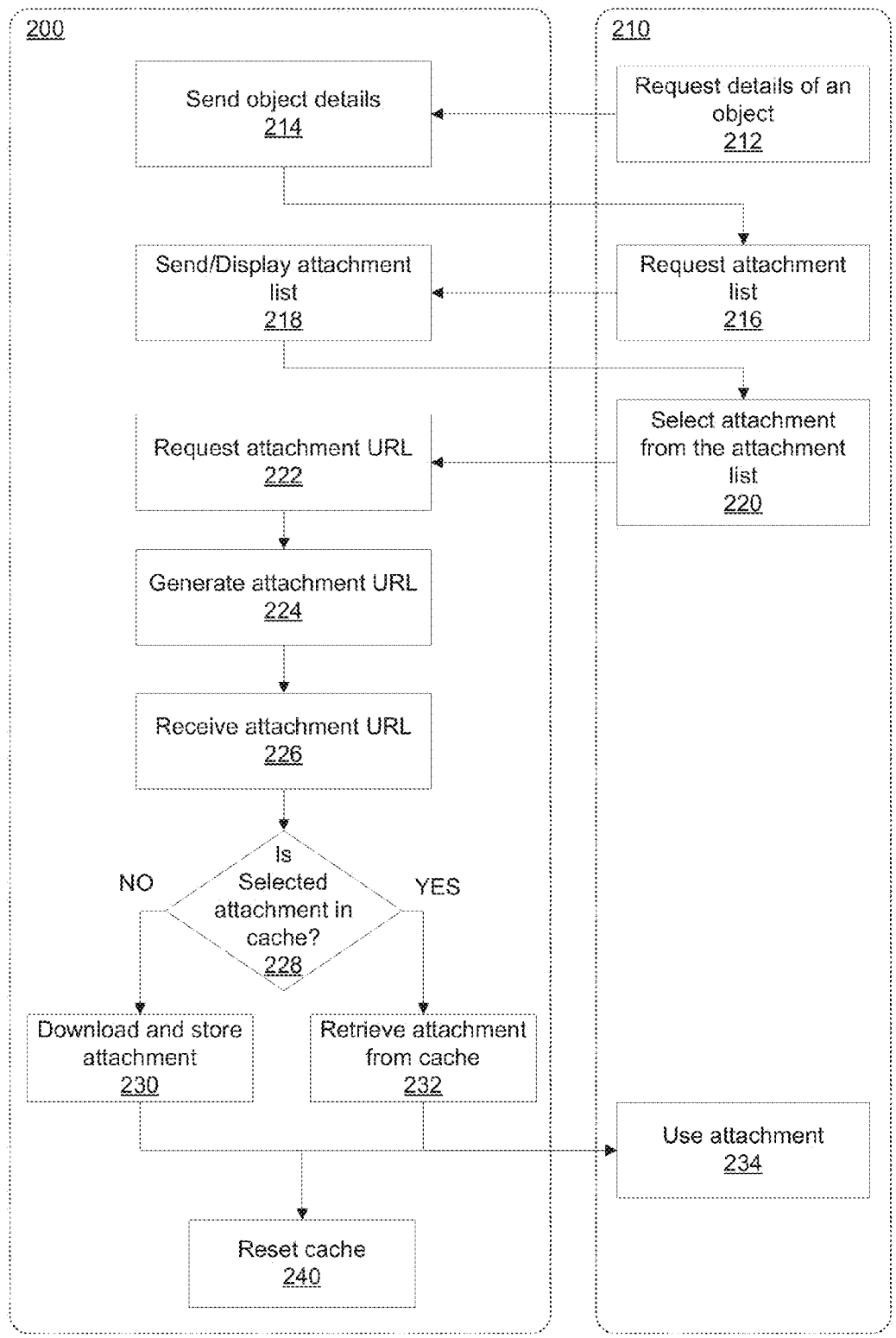
FIG. 2 illustrates a method of processing a request to receive an attachment according to an embodiment of the present disclosure.

FIG. 2 illustrates a method 200 of processing a request to receive an attachment according to an embodiment of the present disclosure. The method 200 may be performed in response to requests made by a user 210. The user 210 may make the requests via an input device on a client device. The steps of method 200 may be performed by the client device and/or the server.

The user 210 may request details of one or more objects (box 212). The request may be made in response to a notification received by the user or based on an operation the user wants to perform. The request for the object may be made automatically in response to the user executing an operation in an application on the client device. The user may make the request by selecting one of the available business objects displayed by the client device. The client device may display a list of objects for which details can be requested. The business objects may be displayed in a graphical format that allows a user to click on the displayed business object to receive additional details of the selected business object. In response to the selection, a user interface window may be opened with details of the selected business object (e.g., see FIG. 5).

In response to the request for the details of one or more objects, the object details may be sent (box 214) to the user. The object details may be retrieved from a memory storing the object details (e.g., memory on a server or a storage device). The object details may include an indication of whether attachments are associated with the object.

Based on the object details, the user may request an attachment list (box 216). In response to the request, the requested attachment list may be sent and displayed to the user (box 218). In another embodiment, the attachment list may be included as part of the object details sent to the user (box 214).

The attachment list may provide the user with one or more attachments that are associated with the object. The attachment list may include information about the attachments without including the attachment. Details of each attachment may include one or more of attachment name, attachment type, attachment ID, attachment description and attachment size. The attachment list may indicate which attachments can be downloaded by the user. Some attachments may not be downloaded by the user due to security settings for the client device and/or the user.

In one embodiment, the details of the attachment may include a preview of the attachment (e.g., low resolution image) or a portion of the attachment (e.g., introduction to a document, summary of the attachment or predetermined number of frames of a video).

The attachment ID may be a unique ID that is created based on the details of the attachment and/or the association between the attachments and the related object. The attachment ID may be used by the client device, application server and other systems to identify the attachments. The unique ID may be based on a combination of attributes of the attachment and/or the object with which the attachment is associated. For example, the unique ID may be based on a combination of an object ID, class type and object type. The attachment ID may be created when the attachment is associated with the object. In one embodiment, the attachment ID may be created after the attachment is uploaded by a user and linked to a business object. In another embodiment, when the attachment is stored in the backend server side, a different set of parameters may be used to generate the attachment ID.

In one embodiment, the attachment list does not include the attachment uniform resource locators (URLs) for the attachments. The attachment URL provides the location of the attachment from which the attachment may be downloaded. Using the attachment URL the client device may download the attachment. The URL may point to the location which is within the network of the client device or to a location which is outside of the network in which the client device is located. When the URL is selected, the client device may send a request to a webserver and the web server may transmit the attachment referenced by the URL to the client device. Using the URL the client device may request the attachment directly from the source of the attachment without having to make the request via intermediate servers (e.g., application server 108 in FIG. 1).

Based on the information in the attachment list, the user may select an attachment (box 220) to be downloaded to the client device. The selection may include selecting the attachment ID for attachment to be downloaded.

In response to the selection, an attachment URL may be requested (box 222). The request for the attachment URL may be made to a backend server (e.g., Advanced Business Application Programming system). The request may include the attachment ID for which the attachment URL is requested.

Based on the request, the attachment URL may be generated (box 224). The attachment URL may be generated by finding the attachment using the attachment ID and generating the URL based on the location of the attachment. The attachments can be located on the backend server using a special component with backend application programming interfaces to retrieve the attachment data based on the given attachment ID. The component may be reused by several SAP® applications including, for example, SAP® Promotion Timeline application. When the attachment raw data (e.g. JPEG image) is saved in a database (e.g., SAP® database), the URL may be constructed in a way to point to a web service of the component which delivers the attachment raw data (e.g. JPEG image) upon a request.

The URL may include one or more security features. For example, the URL may include an expiration date of when the URL will expire and/or limitations of who may access the URL. The expiration data may be a based on when the URL is generated or when the URL is accessed the first time. In one embodiment, the URL may expire after being accessed a predetermined number of times. A unique URL may be created for the user or the client device making the request for the attachment. The URL may include hash string for improved performance.

The attachment URL may be received by client device (box 226) to be used to download the attachment. Because the URL is generated on demand for the user, there may be no issues with the expiration of the URL.

The method 200 may include determining whether the selected attachment is already stored in the cache (box 228). The determination may be made by comparing the attachment ID of the requested attachment to the attachment IDs for attachments which are already stored in the cache. The cache may be the memory in the client device that is used for temporary storage of data before it is requested or for temporary storage of data likely to be used again. In one embodiments, the cache may be a memory that is not part of the client device but that is associated with the client device (e.g., memory coupled to the client device via an internal network).

If the cache does not include the attachment (NO in box 228), then the attachment may be downloaded (box 230) to the client device. The attachment may be downloaded based on the generated attachment URL. The downloaded attachment may also be stored in the cache. Storing the attachment in the cache may include adding the stored attachment's ID to the list of cached attachments.

If the cache includes the attachment (YES in box 228), then the attachment may be directly retrieved from the cache (box 232) without downloading the attachment from the remote or backend server. Retrieving the attachment from the cache may save time needed to download the attachment and reduce the resources needed for downloading the attachment (e.g., network bandwidth or locating the attachment). Retrieving the attachment from the cache also allows for the user to retrieve a desired attachment when the URL may be expired due to an expiration timestamp included by the backend server, when the network is down, or when the client device is not connected to the network.

After the attachment is retrieved, the attachment may be used by the user (box 234). For example, the user may make decisions based on the information in the attachment, print out the attachment, modify the content of the attachment or associate the attachment with other business objects. Associating the attachment with other business objects may include providing the unique ID of the attachment to the new business object, without attaching the actual attachment.

The cache storing the downloaded attachment may be reset (box 240) when predetermined conditions occur. A condition may be based on time, amount of information in the cache (e.g., percentage filled with data), operation performed by the user, security threat, change in users using the client device, status of application making the request for objects, running a new search query or size of the attachment. The condition may include resetting the cache when a client device that was in an offline mode, changes to an online mode in which attachments can be downloaded.

FIG. 3 illustrates examples of conditions 310 which may be used to reset the cache storing the downloaded attachments. The attachment cache reset event (ACRE) 320 may be activated when one or more of the conditions 310 are satisfied. The business object condition conjunction 330 may determine whether all of the conditions or some of the conditions have to be satisfied to reset the cache. For example, ACRE1 may require all of the conditions to be satisfied in order to reset the cache. Other ACRE 320 events may need only one of the conditions to be true to reset the cache (e.g., ACRE2, ACRE3 or ACRE4). A user may customize the conditions 310 for the cache to be reset.

The cache used to store the attachment may be a predetermined amount of memory in the client device dedicated to store the attachments. In other embodiments, all of the available memory may be used for the attachment cache. Thus, the amount of memory used for the attachment cache may change based on other resources using the available memory.

In one embodiment, instead of resetting the cache, one or more of the attachments in the cache may be deleted while other attachments remain in the cache. For example, if there is insufficient amount of space for a new attachment to be downloaded, one of the other attachments that meets a predetermined condition may be deleted. The predetermined condition for the attachment to be deleted may be the oldest attachment, the largest attachment, or the least accessed attachment. In another embodiment, one or more attachments that are associated with a specific user may be deleted when the user finishes his session.

FIG. 4 illustrates a method 400 of processing a request by a client device to receive an attachment according to an embodiment of the present disclosure. The method 400 may be performed by a client device.

The client device may request details of an object (box 410). The user may make the request by selecting one of the available objects displayed by the client device. The client device may display a list of objects for which details can be requested by the user using the client device.

In response to the request, the object details may be sent by a server and received by the client device (box 412). The object details may be received from a memory storing the object details (e.g., memory on a server or a storage device). The object details may include attachments which are associated with the object. The information about the associated attachments may not include the actual attachment and the URL for downloading the attachment.

After the client device receives the object details, the user may select to display information about the attachment associated with the object. In response to the request, the client device may display information on the attachments associated with the object (box 414). The information about the associated attachments may include the name of the attachment, the size of the attachment, attachment ID, the type of attachment, attachment description and whether the user using the user device may download the attachment to the client device. In one embodiment, only information for the attachments which are allowed to be downloaded by the user may be displayed to the user. In another embodiment, displayed information on the attachments associated with the object may include which attachments are supported by the client device being used to request the attachment. For example, a particular client device may not support an attachment because the client device is not able to download an attachment that is over a particular size or the client device does not include an application to display a certain type of attachment.

Based on the displayed information, the user may select an attachment (box 416) to be downloaded to the client device. The selection may include selecting the attachment ID or the attachment name.

In response to the selection, client device may determine whether the selected attachment is already stored in the cache of the client device (box 418). The determination may be made by comparing the attachment ID of the requested attachment to the attachment IDs for attachments which are already stored in the cache.

If the cache does not include the attachment (NO in box 418), then the client device may request a URL of the selected attachment (box 420). The request for the URL may be sent to a server. The server may locate the attachment based on the ID of the requested attachment and generate a URL based on the location of the requested attachment.

The client device may receive the generated URL (box 422) from the server and download the attachment to the client device (box 424). The downloaded attachment may also be stored in the cache of the client device (box 426). The attachment may be downloaded based on the generated attachment URL and stored in the cache. Storing the attachment in the cache may also include the stored attachment's ID in the list of cached attachments.

If the cache includes the attachment (YES in box 418), then the attachment may be directly retrieved from the cache (box 428) without downloading the attachment from the remote or backend server. Retrieving the attachment from the cache may save time needed to download the attachment and reduce the resource needed for the download (e.g., network bandwidth or locating the attachment). Retrieving the attachment from the cache also allows for the user to retrieve a desired attachment when the URL may be expired due to an expiration timestamp included in the URL.

The downloaded attachment or the attachment retrieved from the cache may be used by the client device (box 430). For example, the user may make decisions based on the information in the attachment, print out or modify the content of the attachment.

In one embodiment, the client device may be a terminal executing an application on the application server (e.g., application server 180 shown in FIG. 1). In this embodiment, the server may display a user interface on the client device and the user may make requests via the user interface displayed on the client device. The attachments may be downloaded to the server and the cache of the server may store the downloaded attachments. The requested attachment may be displayed by the server on the client device without having to send the attachment to the client device. In this embodiment, the same server may download the attachment and generate the URL to download the attachment or different servers may be used to perform these steps.

If the cache of the server is used to store downloaded attachments, the cache may store attachments requested by multiple client devices. The attachments in the cache of the server originally requested by one client device may be displayed on other client devices requesting the same attachment.

In another embodiment, displaying the attachments associated with a requested object may include information about which attachments are available in the cache and which attachments still need to be downloaded. Thus the user may make a decision on which attachment to request based on the availability of the attachments in the cache.

Figure 5:
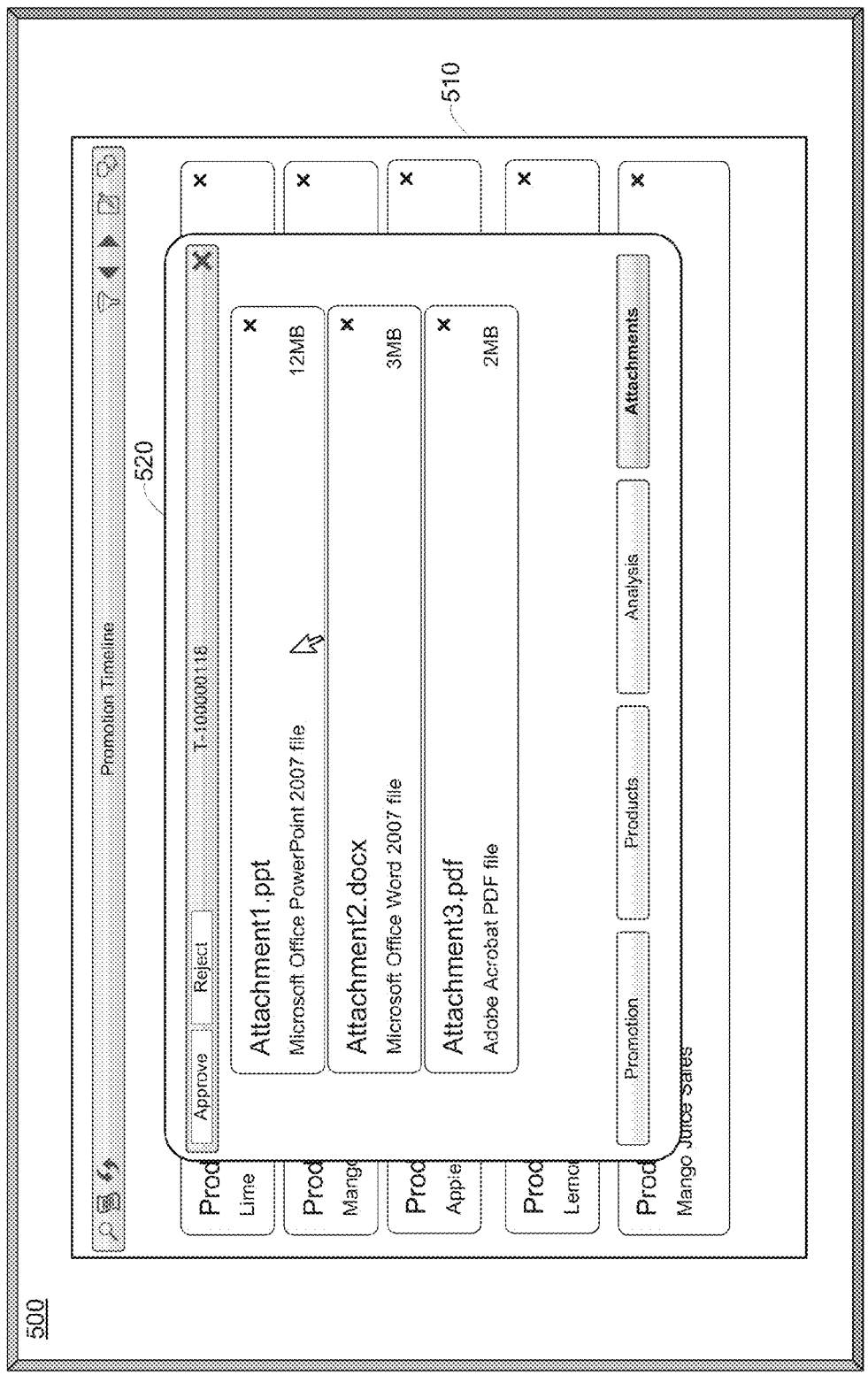
FIG. 5 illustrates a user interface that may be used to request an attachment according to an embodiment of the present disclosure.

FIG. 5 illustrates a user interface that may be used to request an attachment according to an embodiment of the present disclosure. The user interface may be displayed on a client device 500. The client device 500 may include a display 510 to display information about a business object (e.g., business objects for a promotion timeline). In response to a user command, the business object details may be displayed with a list of attachments 520. The list of attachments 520 may include a plurality of attachments that are associated with the business object and which can be downloaded by the user to the client device. As shown in FIG. 5, the attachment list 520 includes the name of each attachment, the type of attachment and the size of the attachment. In response to a user selecting one of the attachments (e.g., attachment1.ppt), the user device may send a request for the attachment URL and download the attachment using the attachment URL.

Figure 6:
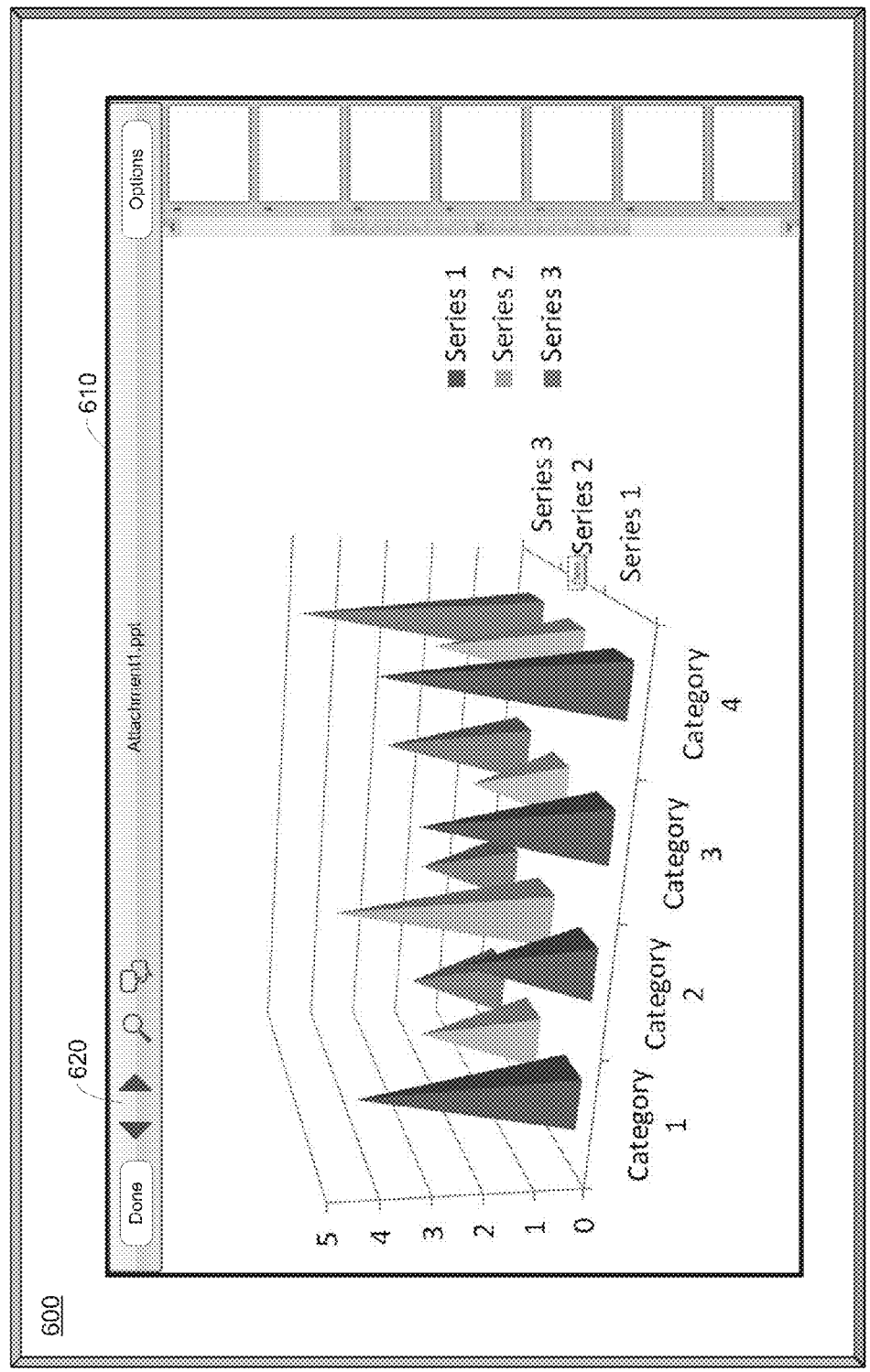
FIG. 6 illustrates a user interface that may be used to display a requested attachment according to an embodiment of the present disclosure.

FIG. 6 illustrates a user interface that may be used to display a requested attachment according to an embodiment of the present disclosure. The user interface may be displayed on a client device 600. The client device 600 may include a display 610 to display the attachment (e.g., attachemtn1.ppt). The attachment may be displayed after it is retrieved from the cache or from a server using the attachment URL. The user may navigate to a next attachment using navigation controls 620 without having to go back to the list of available attachments (shown in FIG. 5). In response, to selecting one of the navigation controls 620 the client device may display the next attachment by obtaining the attachment from the cache or from a server using the attachment URL.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hardwired circuitry in place of, or in combination with machine readable software instructions.

Figure 7:
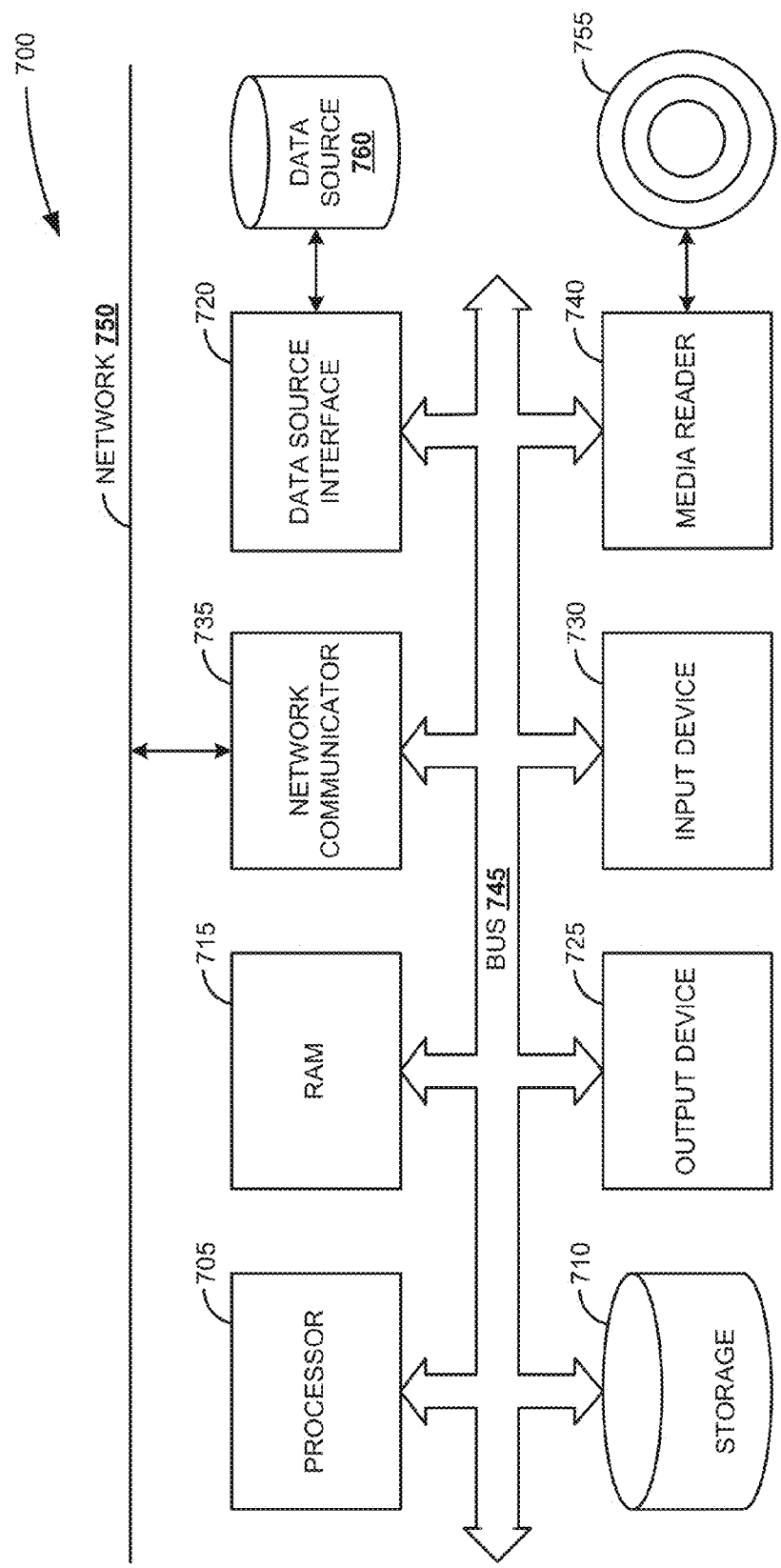
FIG. 7 is a block diagram of an exemplary computer system that may be used with the embodiments of the present disclosure.

FIG. 7 is a block diagram of an exemplary computer system 700. The computer system 700 includes a processor 705 that executes software instructions or code stored on a computer readable storage medium 755 to perform the above-illustrated embodiments of the disclosure. The computer system 700 includes a media reader 740 to read the instructions from the computer readable storage medium 755 and store the instructions in storage 510 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the disclosure, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., Online Analytic Processing—OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., Enterprise resource planning system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

In the above description, numerous specific details are set forth to provide a thorough understanding of embodiments of the disclosure. One skilled in the relevant art will recognize, however that the various embodiments can be practiced without one or more of the specific details or with other methods, components, techniques, etc. In other instances, well-known operations or structures are not shown or described in detail to avoid obscuring aspects of the disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize. These modifications can be made to the embodiments in light of the above detailed description.

We claim:

1. A method for implementation by one or more data processors forming part of at least one computing device, the method comprising:
   requesting, by at least one data processor, details of an object;
   receiving, by at least one data processor, the object details including attachment details for attachments associated with the object, the attachment details for each attachment including an attachment name and an attachment ID;
   in response to a request to display the attachment details for the attachments associated with the object, displaying, by at least one data processor, at least the attachment name for each attachment associated with the object;
   in response to a selection of one attachment from the attachments associated with the object, determining, by at least one data processor, if a list including attachments stored in an attachment cache includes the attachment ID of the selected attachment;
   if the list includes the attachment ID of the selected attachment, retrieving, by at least one data processor, the selected attachment from the attachment cache; and
   if the list does not include the attachment ID of the requested attachment:
      requesting, by at least one data processor, a URL of the selected attachment using the attachment ID;
      receiving, by at least one data processor, the URL of the selected attachment;
      downloading, by at least one data processor, the selected attachment using the URL; and
      storing, by at least one data processor, the downloaded attachment in the attachment cache;
   wherein:
      the attachment details further include an attachment size and an attachment description;
      the attachment ID is a unique ID for each attachment generated based on an object ID, class and object type;
      the URL includes an expiration time after which the URL becomes invalid;
      the cache is reset when a predetermined condition occurs, the predetermined condition includes at least one of an application requesting the object is closed, the attachment cache reaches a preset size limit, a new search is executed, a number of attachments in the attachment cache reaches a preset attachment limit, and a user requesting the object changes.

2. The method of claim 1, further comprising deleting, by at least one data processor, at least one attachment stored in the cache when the attachment stored in the cache meets a predetermined condition.

3. The method of claim 1, wherein the URL of the selected attachment is received from a backend server that determines a location of the selected attachment based on the attachment ID and generates the URL of the selected attachment based on the location of the selected attachment.

4. The method of claim 3, wherein the URL is generated for a specific user making the request for the URL, and only the specific user can download the attachment using the URL.

5. A method for implementation by one or more data processors forming part of at least one computing device, the method comprising:
   receiving, by at least one data processor from a client device, a first request for an object;
   retrieving and sending, by at least one data processor, details of the requested object, the details of the object including attachment details for attachments associated with the object, and the attachment details for each attachment including an attachment name and an attachment ID;
   receiving, by at least one data processor from the client device, a second request for an attachment selected from the attachments associated with the object, the second request including an attachment ID of the selected attachment;
   determining, by at least one data processor, if an attachment cache includes the selected attachment;
   if the attachment cache includes the selected attachment, retrieving, by at least one data processor, the selected attachment from the attachment cache and providing the selected attachment to the client device;
   if the attachment cache does not include the selected attachment;
      determining, by at least one data processor, a location of the selected attachment based on the attachment ID;
      generating, by at least one data processor, a URL of the selected attachment based on the location of the selected attachment;
      downloading, by at least one data processor, the selected attachment using the URL;
      storing, by at least one data processor, the downloaded attachment in the attachment cache; and
      providing, by at least one data processor, the data of the selected attachment to the client device;
   wherein:

the attachment details further include an attachment size and an attachment description;

the attachment ID is a unique ID for each attachment generated based on and object ID, class and object type;

the URL includes an expiration time after which the URL becomes invalid;

the cache is reset when a predetermined condition occurs, the predetermined condition includes at least one of an application requesting the object is closed, the attachment cache reaches a preset size limit, a new search is executed, a number of attachments in the attachment cache reaches a preset attachment limit, and a user requesting the object changes.

6. The method of claim 5, further comprising deleting, by at least one data processor, at least one attachment stored in the cache when the attachment stored in the cache meets a predetermined condition.

7. The method of claim 5, wherein the attachment cache is part of a server receiving the requests from the client device.

8. The method of claim 5, wherein the attachment cache is part of the client device making the request for the object.

9. The method of claim 5, wherein the attachments are downloaded from an external server that is outside of the internal network including the client device.

10. A non-transitory computer readable medium containing program instructions, wherein execution of the program instructions by one or more processors of a computer system causes one or more processors to perform operations comprising:

displaying a user interface on a client device, receiving, from the client device, a first request for a business object;

retrieving and sending details of the requested business object to the client device, the details of the business object including attachment details for attachments associated with the business object, the attachment details for each attachment including an attachment name, an attachment ID and an attachment size, and the attachment details do not include the attachment, wherein the attachment ID is a unique ID generated based on a business object ID, class and business object type;

displaying an attachment list in the user interface on the client device, the attachment list including the attachments associated with the business object;

receiving, from the client device, a second request for an attachment selected from the attachment list, the second request including an attachment ID of the selected attachment;

determining if an attachment cache on the client device includes the selected attachment;

if the attachment cache includes the selected attachment, retrieving the selected attachment from the attachment cache and displaying the selected attachment on the client device;

if the attachment cache does not include the selected attachment:
  determining a location of the selected attachment based on the attachment ID;
  generating a URL of the selected attachment based on the location of the selected attachment, the URL includes an expiration time after which the URL becomes invalid;
  sending the generated URL to the client device;
  downloading the selected attachment to the client device using the URL;
  storing the downloaded attachment in the attachment cache; and
  displaying the downloaded attachment on the client device;

resetting the attachment cache when a predetermined condition occurs, the predetermined condition includes at least one of an application requesting the business object is closed, the attachment cache reaches a preset size limit, a new search is executed, a number of attachments in the attachment cache reaches a preset attachment limit, and a user requesting the business object changes.

11. The non-transitory computer readable medium of claim 10, wherein the operations further comprise: deleting at least one attachment stored in the cache when the attachment stored in the cache meets a predetermined condition.

12. The non-transitory computer readable medium of claim 10, wherein the URL of the selected attachment is received from a backend server that determines a location of the selected attachment based on the attachment ID and generates the URL of the selected attachment based on the location of the selected attachment.

13. The non-transitory computer readable medium of claim 12, wherein the URL is generated for a specific user making the request for the URL, and only the specific user can download the attachment using the URL.

* * * * *